United States Patent
Ono et al.

(10) Patent No.: US 8,919,468 B2
(45) Date of Patent: Dec. 30, 2014

(54) DRIVING-POWER CONTROL DEVICE FOR VEHICLE

(71) Applicant: Denso Corporation, Kariya (JP)

(72) Inventors: Hiroaki Ono, Tokoname (JP); Toyoji Yagi, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 14/097,957

(22) Filed: Dec. 5, 2013

(65) Prior Publication Data

US 2014/0158441 A1    Jun. 12, 2014

(30) Foreign Application Priority Data

Dec. 6, 2012   (JP) ................................ 2012-266878

(51) Int. Cl.
| | |
|---|---|
| *B60W 10/18* | (2012.01) |
| *B60W 20/00* | (2006.01) |
| *B60W 10/02* | (2006.01) |
| *B60W 10/06* | (2006.01) |
| *B60W 10/08* | (2006.01) |

(52) U.S. Cl.
CPC ............... *B60W 20/10* (2013.01); *B60W 10/02* (2013.01); *B60W 10/06* (2013.01); *B60W 10/08* (2013.01); *Y10S 903/93* (2013.01)
USPC .................. 180/65.265; 180/65.285; 903/930

(58) Field of Classification Search
USPC ............... 180/65.265, 65.285, 65.27, 65.275, 180/165; 701/48, 70; 903/930, 947
See application file for complete search history.

(56) References Cited

U.S. PATENT DOCUMENTS

| | | | |
|---|---|---|---|
| 5,960,897 A | 10/1999 | Furuya et al. | |
| 7,823,668 B2* | 11/2010 | Ogata et al. | 180/65.265 |
| 8,118,121 B2* | 2/2012 | Vargas | 180/65.24 |
| 2004/0168449 A1 | 9/2004 | Homan et al. | |
| 2010/0305795 A1* | 12/2010 | Kuang et al. | 701/22 |

FOREIGN PATENT DOCUMENTS

| | | |
|---|---|---|
| JP | 09-224301 | 8/1997 |
| JP | 2000-224710 | 8/2000 |
| JP | 2004-017919 | 1/2004 |
| JP | 2004-168176 | 6/2004 |
| JP | 2010-130890 | 6/2010 |

OTHER PUBLICATIONS

Japanese Office Action (2 pages), dated Oct. 20, 2014, issued in corresponding Japanese Application No. 2012-266878 and English translation (3 pages).

* cited by examiner

*Primary Examiner* — John Walters
*Assistant Examiner* — James Triggs
(74) *Attorney, Agent, or Firm* — Nixon & Vanderhye PC

(57) ABSTRACT

Since a power of an engine is transmitted to a first axle and a power of a MG is transmitted to a second axle, a space for providing the MG can be readily ensured. Further, since an accessory is driven by the power of the engine, a private power source for the accessory is not necessary. In this case, the accessory may be a water pump, an oil pump, or an air-conditioner compressor. Furthermore, since a vehicle driving mode is switched between an engine driving mode and a MG driving mode, only a control system relative to the MG driving mode is necessary to be developed when the hybrid vehicle is developed by using the engine vehicle as the base part.

11 Claims, 10 Drawing Sheets

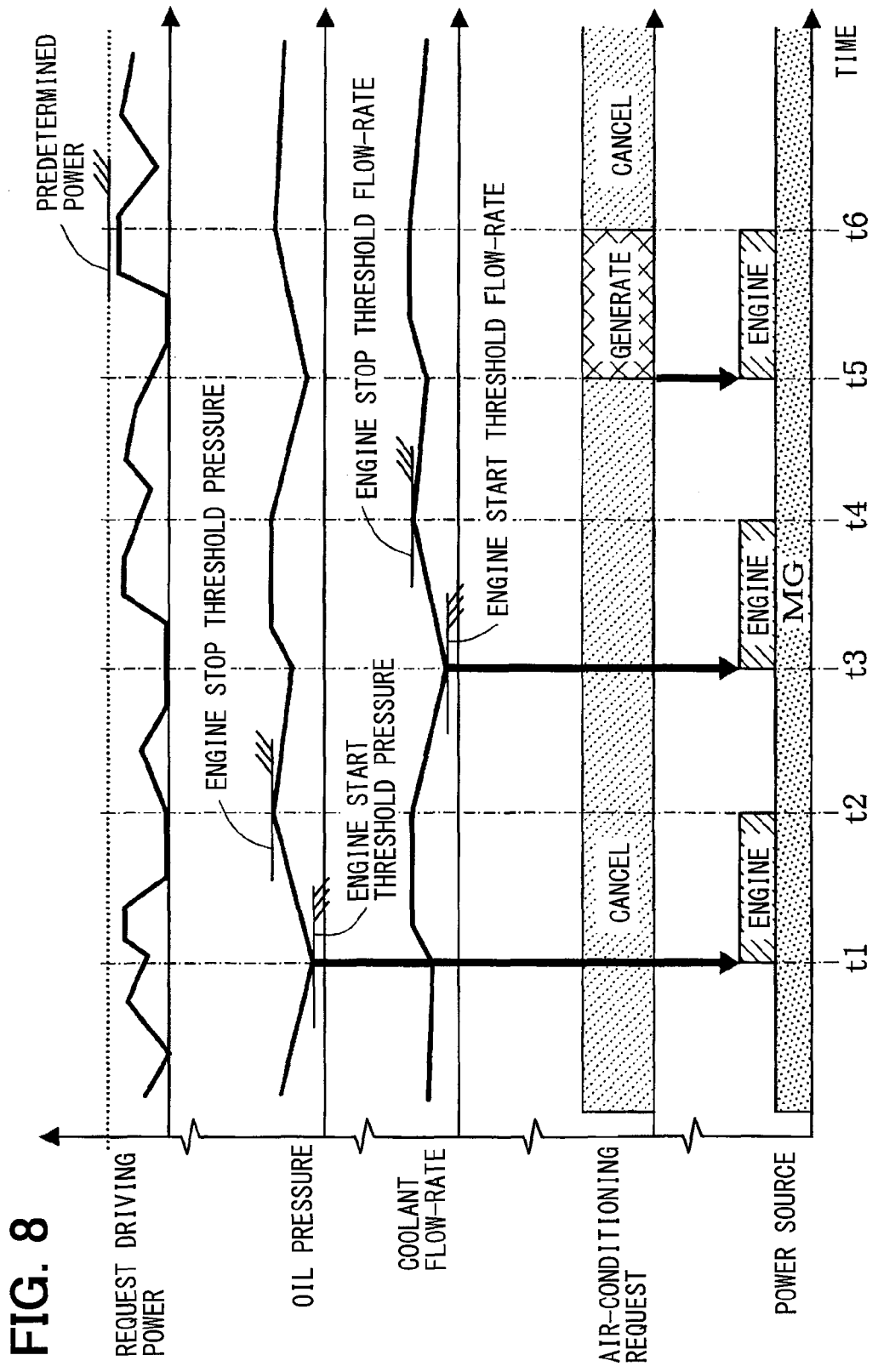

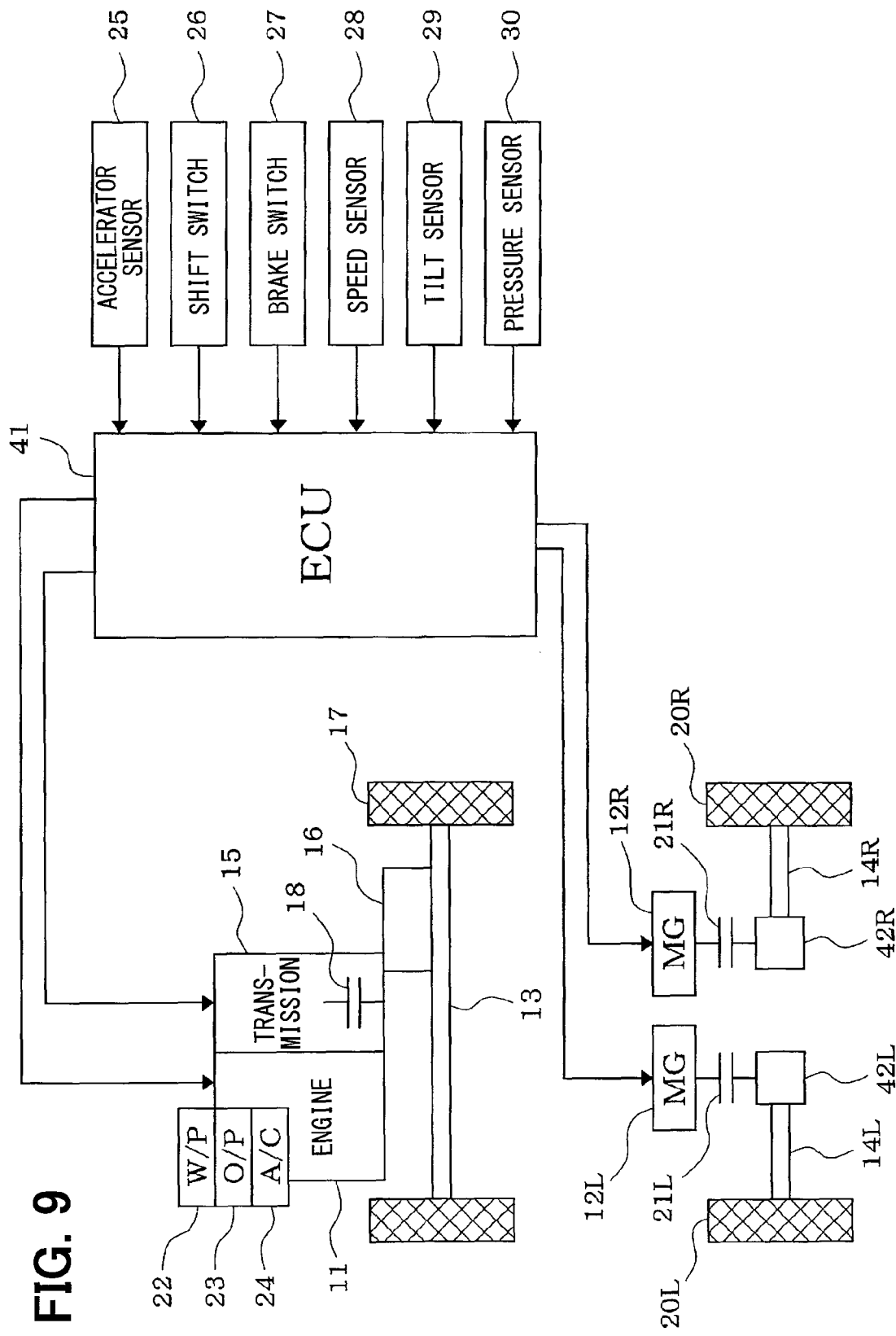

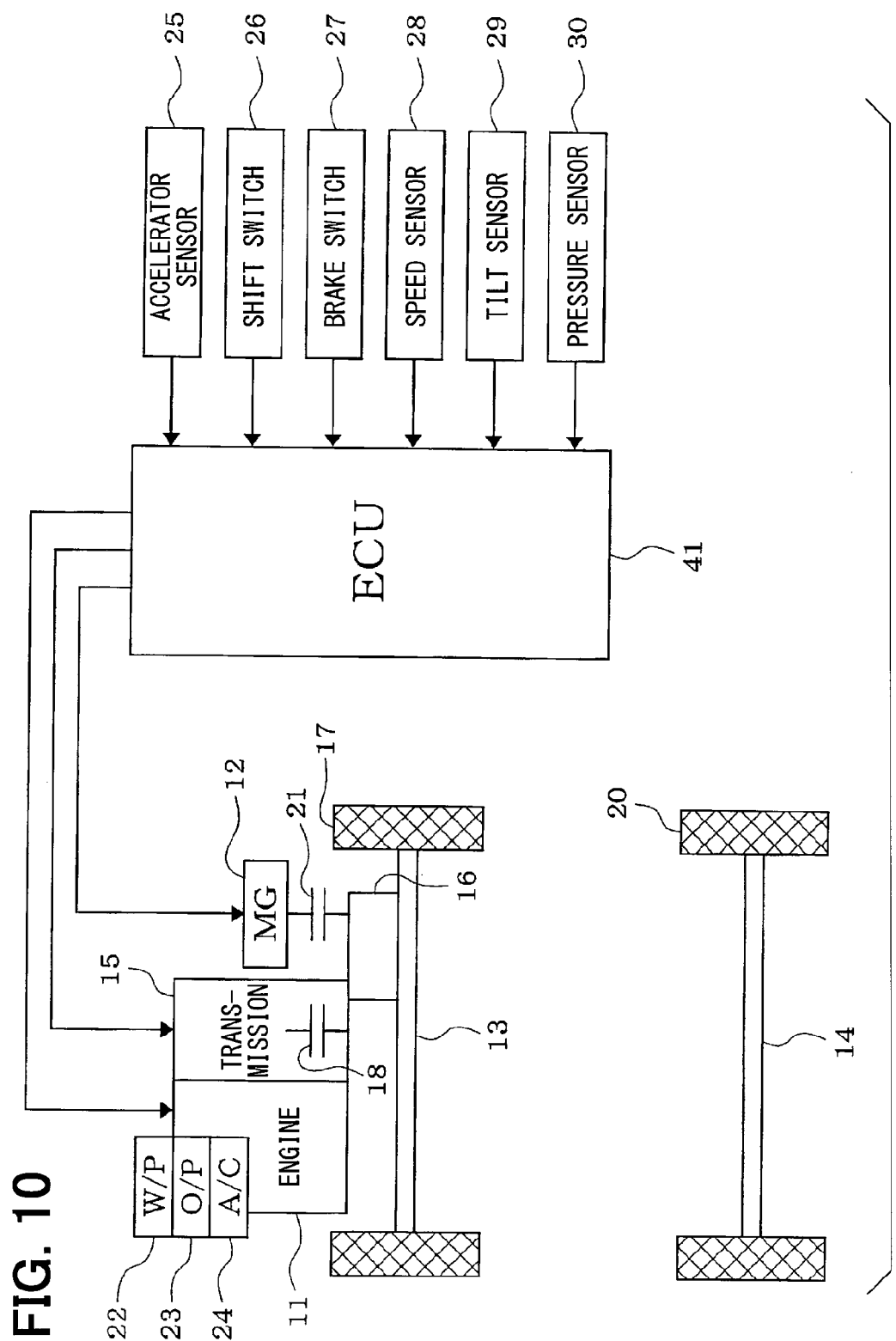

DRIVING-POWER CONTROL DEVICE FOR VEHICLE

CROSS-REFERENCE TO RELATED APPLICATION

This application is based on Japanese Patent Application No. 2012-266878 filed on Dec. 6, 2012, the disclosure of which is incorporated herein by reference.

TECHNICAL FIELD

The present disclosure relates to a driving-power control device for a vehicle equipped with an engine and a motor as power sources.

BACKGROUND

A hybrid vehicle equipped with an engine and a motor as power sources is well known. For example, JP-2004-276908A discloses a hybrid vehicle which has another motor other than the engine and the motor. Another motor is for driving a compressor of an air conditioner.

Further, the hybrid vehicle switches a vehicle driving mode between an engine driving mode that drives an axle by using a power of the engine, a motor driving mode that drives the axle by using a power of the motor, and a hybrid mode that drives the axle by using the power of at least one of the engine or the motor according to a cooperation control.

According to JP-2004-276908A, since another motor is necessary, a configuration of the vehicle becomes complicated, and a cost of the vehicle may be increased.

Further, in a system switching the vehicle driving mode between the engine driving mode, the motor driving mode, and the hybrid mode, when a control system is developed based on an engine vehicle only provided with an engine as the power source, both a control relative to the motor driving mode and a control relative to the hybrid mode are necessary to be developed, and a development man-hour is increased.

SUMMARY

It is an object of the present disclosure to provide a driving-power control device for a vehicle, which has a simple configuration and a low cost and can reduce a development man-hour.

According to an aspect of the present disclosure, a driving-power control device for a vehicle equipped with an engine and a motor as power sources. The driving-power control device includes an axle to which a power of the engine and a power of the motor are transmitted in parallel, at least one of a water pump, an oil pump, and an air-conditioner compressor which rotates synchronously with the engine, and a control portion. The control portion switches a vehicle driving mode between an engine driving mode that the axle is driven by the power of the engine and a motor driving mode that the axle is driven by the power of the motor.

In this configuration, since an accessory corresponding to a water pump, an oil pump, or an air-conditioner compressor can be driven by the power of the engine, a private power source for the accessory such as a motor is not necessary. Thus, the configuration of the vehicle can be simplified, and a cost of the vehicle can be reduced.

Furthermore, since the vehicle driving mode is switched between the engine driving mode and the motor driving mode, only a control system relative to the motor driving mode is necessary to be developed when the hybrid vehicle is developed by using the engine vehicle as the base part. In this case, a development man-hour can be reduced comparing to a development in which both a control system relative to the motor driving mode and a control system relative to a hybrid mode are developed.

BRIEF DESCRIPTION OF THE DRAWINGS

The above and other objects, features and advantages of the present disclosure will become more apparent from the following detailed description made with reference to the accompanying drawings. In the drawings:

FIG. 8 is a time chart showing an example of an engine starting in a MG driving mode;

FIG. 9 is schematic diagram showing the outline of the vehicle driving-control system according to a second embodiment of the present disclosure; and FIG. 10 is schematic diagram showing the outline of the vehicle driving-control system according to a third embodiment of the present disclosure.

DETAILED DESCRIPTION

Figure 1:
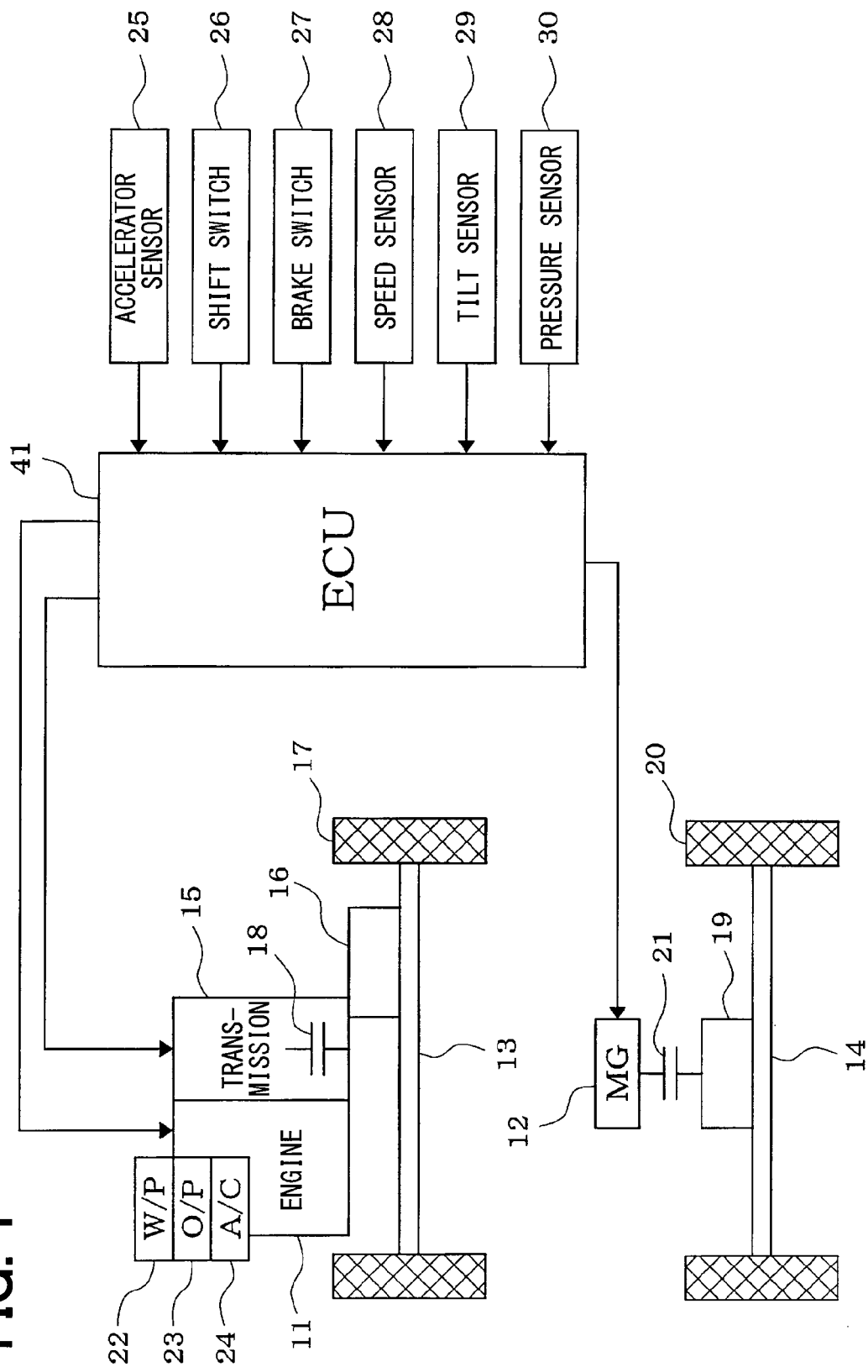
FIG. 1 is a schematic diagram showing an outline of a vehicle driving-control system according to a first embodiment of the present disclosure.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Hereafter, embodiments of the present disclosure will be detailed.

First Embodiment

A first embodiment of the present disclosure will be described with reference to FIGS. 1 to 8.

First, an outline of a vehicle driving control system will be described with reference to FIG. 1.

The vehicle driving control system is provided with an engine 11 corresponding to an internal combustion engine and a motor generator 12 as power sources of the vehicle. According to the present embodiment, the motor generator 12 is referred to as a MG 12. A power of the engine 11 and a power of the MG 12 are transmitted to axles 13 and 14 in parallel, respectively. Specifically, the power of the engine 11 is transmitted to a first axle 13, and the power of the MG 12 is transmitted to a second axle 14. In other words, the power of the engine 11 and the power of the MG 12 are transmitted to different axles. For example, the first axle 13 is used for front wheels, and the second axle 14 is used for rear wheels.

A power of an output shaft of the engine 11 is transmitted to a transmission 15, and a power of an output shaft of the transmission 15 is transmitted to a first wheel 17 via a first differential gear mechanism 16 and the first axle 13. According to the first embodiment, the output shaft of the engine 11 corresponds to a crank shaft. The first wheel 17 may correspond to a front wheel, for example. The transmission 15 may be a stepped transmission that switches a variable speed level among a plurality of levels in stages, or may be a continuously variable transmission (CVT) that changes gears continuously.

A first clutch 18 is provided between the transmission 15 and the first differential gear mechanism 16 to block or allow a power transmission between the engine 11 and the first axle 13. The first clutch 18 is arranged at a position close to the engine 11. The first clutch 18 corresponds to an engine-side clutch. The first clutch 18 may be an oil clutch that is driven by oil pressure, or may be an electromagnetic clutch that is driven by electromagnetic power.

A power of a rotation shaft of the MG 12 is transmitted to a second wheel 20 via a second differential gear mechanism 19 and the second axle 14. For example, the second wheel 20 may correspond to a rear wheel. A second clutch 21 is provided between the MG 12 and the second differential gear mechanism 19 to block or allow a power transmission between the MG 12 and the second axle 14. The second clutch 21 is arranged at a position close to the MG 12. The second clutch 21 corresponds to a motor-side clutch. The second clutch 21 may be an oil clutch that is driven by oil pressure, or may be an electromagnetic clutch that is driven by electromagnetic power.

An accessory such as a water pump (W/P) 22 for coolant circulation, an oil pump (O/P) 23 for generating an oil pressure, or an air-conditioner compressor (A/C) 24 for an air conditioner, is connected with the engine 11 via a power transmission mechanism which is not shown, to transmit power therebetween. Specifically, the accessory rotates synchronously with the engine 11, and is driven by the power of the engine 11. In addition, the power transmission mechanism may be a belt mechanism, a chain mechanism, or a gear mechanism.

An accelerator sensor 25 detects an accelerator opening degree corresponding to an operation amount of an accelerator pedal. A shift switch 26 detects a shift position corresponding to an operation position of a shift lever. A brake switch 27 detects a brake operation. A speed sensor 28 detects a vehicle speed. A tilt sensor 29 detects a tilt angle of the vehicle. A pressure sensor 30 detects a negative pressure in a brake booster which is not shown. The brake booster increases a depressing force to the brake pedal by using an intake pipe negative-pressure of the engine 11. Therefore, a braking force of the brake is increased.

Figure 2:
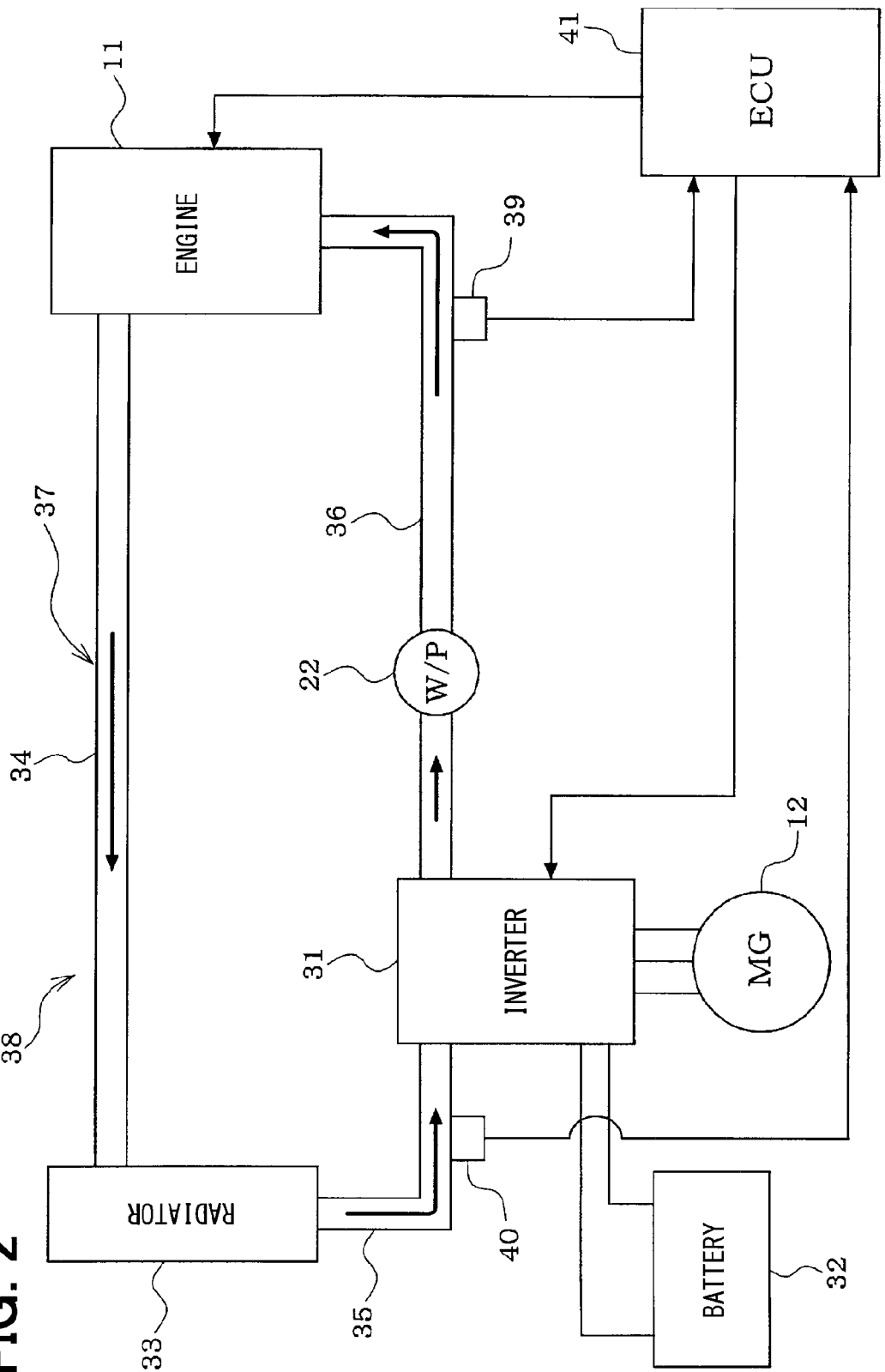
FIG. 2 is a schematic diagram showing a cooling system.

Next, an outline of a cooling system will be described with reference to FIG. 2.

An inverter 31 driving the MG 12 is connected with a battery 32. An electrical power is transferred between the MG 12 and the battery 32 via the inverter 31.

Coolant passages which are not shown are provided in the engine 11 and the inverter 31. An outlet of the coolant passage of the engine 11 communicates with an inlet of a radiator 33 via a first coolant circulation pipe 34. An outlet of the radiator 33 communicates with an inlet of the coolant passage of the inverter 31 via a second coolant circulation pipe 35. An outlet of the coolant passage of the inverter 31 communicates with an inlet of the coolant passage of the engine 11 via a third coolant circulation pipe 36. Therefore, a coolant circulation cycle 37, in which a coolant flows through the coolant passage of the engine 11, the first coolant circulation pipe 34, the radiator 33, the second coolant circulation pipe 35, the coolant passage of the inverter 31, and the third coolant circulation pipe 36 and flows back to the coolant passage of the engine 11, is generated. The water pump 22 is arranged in the coolant circulation cycle 37 to circulate the coolant. For example, the water pump 22 is arranged in the third coolant circulation pipe 36.

A cooling device 38 circulating the coolant between the engine 11, the inverter 31, and the radiator 33, to cool down the engine 11 and the inverter 31 is constructed by the coolant passage of the engine 11, the coolant passage of the inverter 31, the radiator 33, the coolant circulation pipes 34 to 36, and the water pump 22. The cooling device 38 is shared by the engine 11 and the inverter 31.

The third coolant circulation pipe 36 is provided with a first temperature sensor 39 to detect a temperature of the coolant flowing into the coolant passage of the engine 11. In this case, the temperature corresponds to an engine coolant temperature. The second coolant circulation pipe 35 is provided with a second temperature sensor 40 to detect a temperature of the coolant flowing into the coolant passage of the inverter 31. In this case, the temperature corresponds to an inverter coolant temperature.

All of outputs of the above sensors and switches are inputted into an electric control unit (ECU) 41. The ECU 41 corresponding to a control portion is mainly constructed by a micro computer and a read-only memory (ROM). The ROM corresponds to a storage medium. The ECU 41 controls the engine 11 and the MG 12 by executing various control programs stored in the ROM according to an operation state of the vehicle.

The ECU 41 may be one control unit, but not limited to this configuration. For example, the ECU 41 may be constructed by a hybrid ECU that comprehensively controls the hybrid vehicle, an engine ECU that controls the engine 11, and a MG-ECU that controls the inverter 31 to control the MG 12.

The ECU 41 switches a vehicle driving mode between an engine driving mode and a MG driving mode, according to at least one of a charging state of the battery 32, a driver request, a request driving power, and the vehicle speed. In this case, the MG driving mode corresponds to a motor driving mode. The request of the driver, for example, may be the accelerator opening degree. The engine driving mode is a mode that the first axle 13 is driven by the power of the engine 11. The inverter driving mode is a mode that the second axle 14 is driven by the power of the inverter 31. As a result, the vehicle can travel at the vehicle driving mode properly in accordance with the charging state of the battery 32, the driver request, the request driving power, or the vehicle speed.

Figure 3:
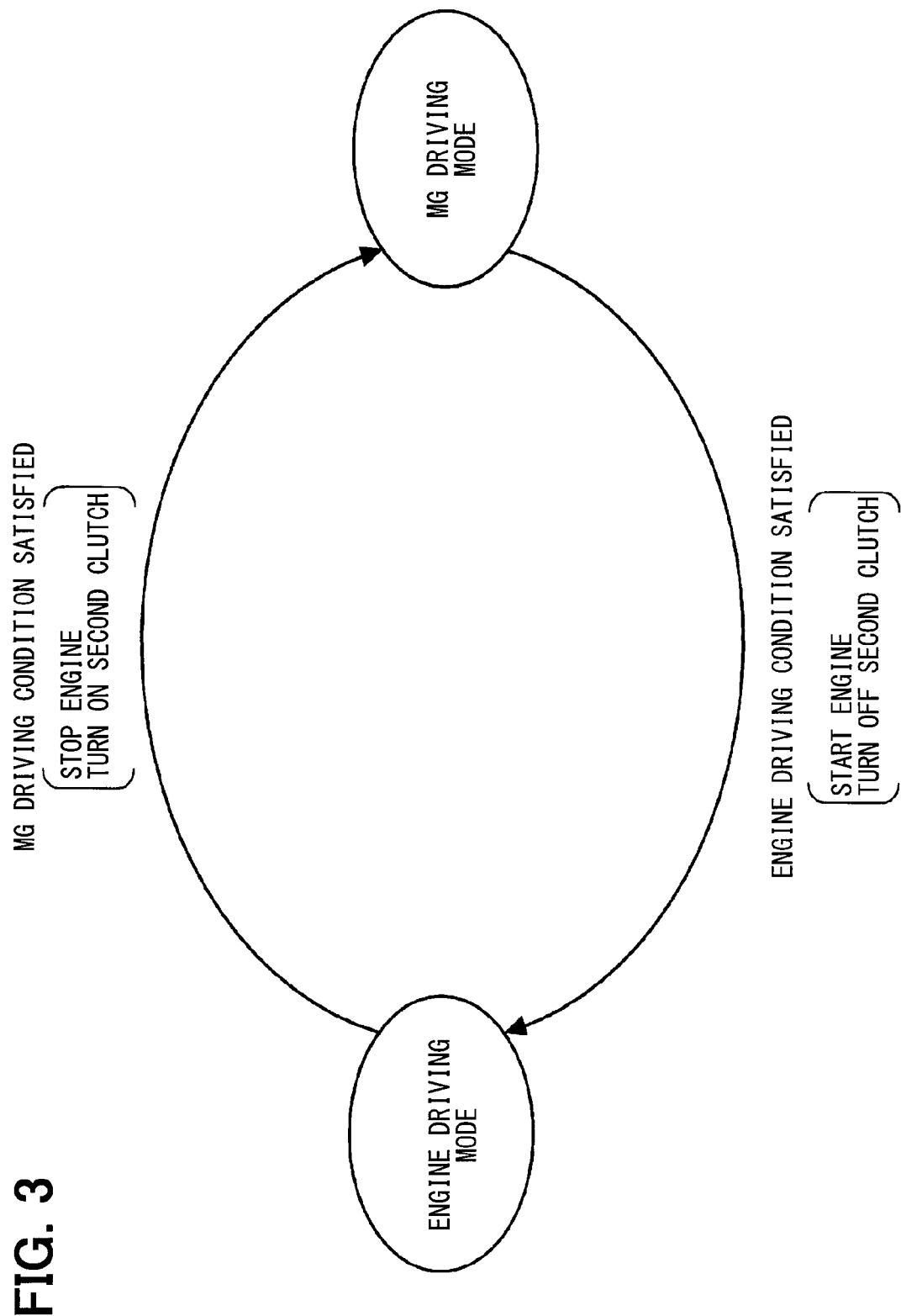
FIG. 3 is a diagram showing a method for switching a vehicle driving mode.

For example, as shown in FIG. 3, when a MG driving condition is satisfied in the engine driving mode, the engine 11 is stopped, and the second clutch 21 is turned on to connect the MG 12 with the second differential gear mechanism 19, and the vehicle driving mode is switched to the MG driving mode. For example, the MG driving condition is at least one of a condition where the vehicle speed is less than or equal to a predetermined speed, a condition where the accelerator opening degree is less than or equal to a predetermined degree, or a condition where the request driving power is less than or equal to a predetermined power. In the MG driving mode, the MG 12 is controlled to output a power to achieve the request driving power computed based on the accelerator opening degree. When the vehicle speed is slowed down, the MG 12 activated as a power generator is driven by a power of the second wheel 20 or a power of the second axle 14. In this case, a kinetic energy of the vehicle is converted to electrical power by the MG 12, and the electrical power is recovered to the battery 32 to execute a regenerative power generation.

When an engine driving condition is satisfied in the MG driving mode, the engine 11 is started, and the second clutch 21 is turned off to disconnect the MG 12 with the second differential gear mechanism 19, and the vehicle driving mode is switched to the engine driving mode. When the second clutch 21 is turned off, the second clutch 21 is opened. For example, the engine driving condition is at least one of a condition where the vehicle speed is greater than or equal to a predetermined speed, a condition where the accelerator opening degree is greater than or equal to a predetermined degree, a condition where the request driving power is greater than or equal to a predetermined power, or a condition where a state of charge (SOC) representing a charging state of the battery 32 is less than or equal to a predetermined value. In the engine driving mode, the engine 11 is controlled to output a power to achieve the request driving power computed based on the accelerator opening degree.

Figure 4:
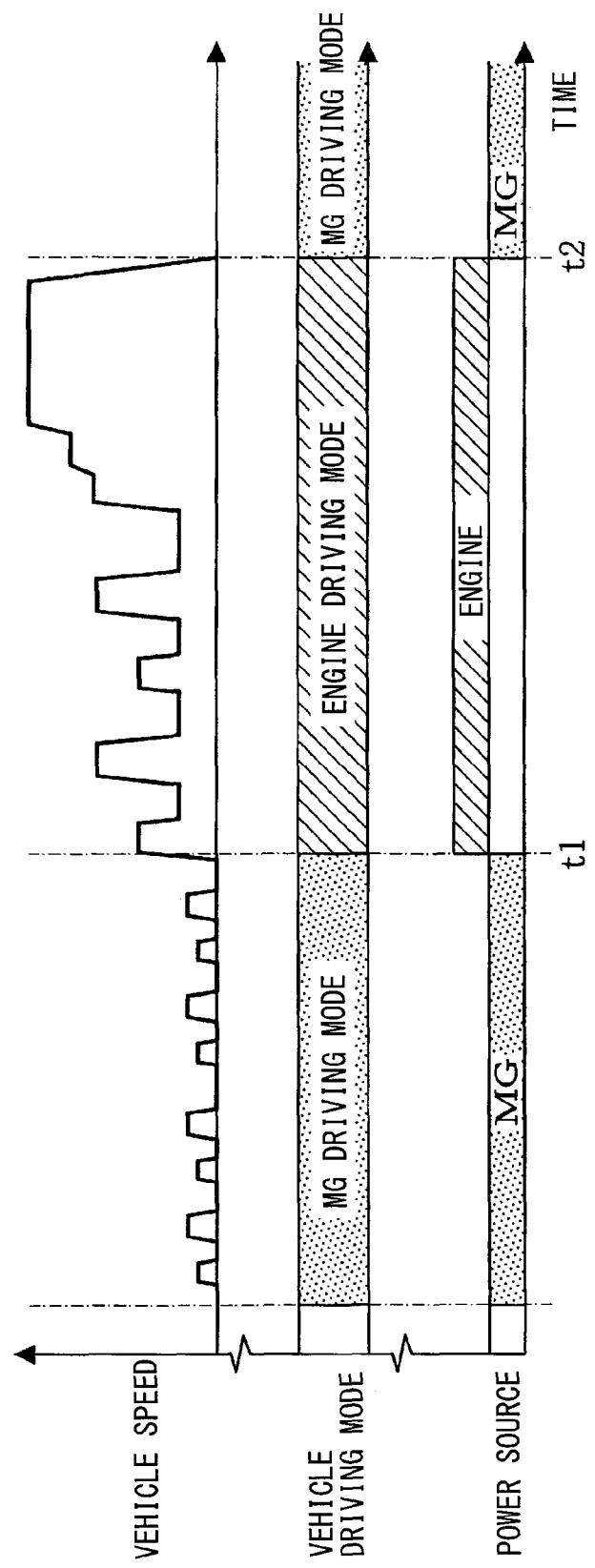
FIG. 4 is a time chart showing an example of switching the vehicle driving mode.

Referring to FIG. 4, an example of switching the vehicle driving mode will be detailed. During a time period where the vehicle speed is less than or equal to the predetermined speed, and the SOC of the battery 32 is greater than or equal to the predetermined value, since the engine driving condition is not satisfied, the vehicle driving mode keeps to the MG driving mode. Therefore, the engine 11 is stopped, and the vehicle travels or stops according to the power of the MG 12 driving the second axle 14.

Then, the engine driving condition is satisfied at a time point t1 where the vehicle speed becomes greater than or equal to the predetermined speed. In this case, the vehicle driving mode is switched to the engine driving mode, the engine 11 is started, and the vehicle travels according to the power of the engine 11 driving the first axle 13.

Then, the MG driving condition is satisfied at a time point t2 where the vehicle speed becomes less than or equal to the predetermined speed. In this case, the vehicle driving mode is switched to the MG driving mode, the engine 11 is stopped, and the vehicle travels or stops according to the power of the MG 12 driving the second axle 14.

As the above description, the ECU 41 turns off the second clutch 21 in the engine driving mode. Therefore, it can be prevented the MG 12 from being rotated integrally with the second axle 14. Thus, a friction loss can be reduced, and a generation of a reverse voltage due to a rotation of the MG 12 can be prevented to protect electrical parts.

Figure 5:
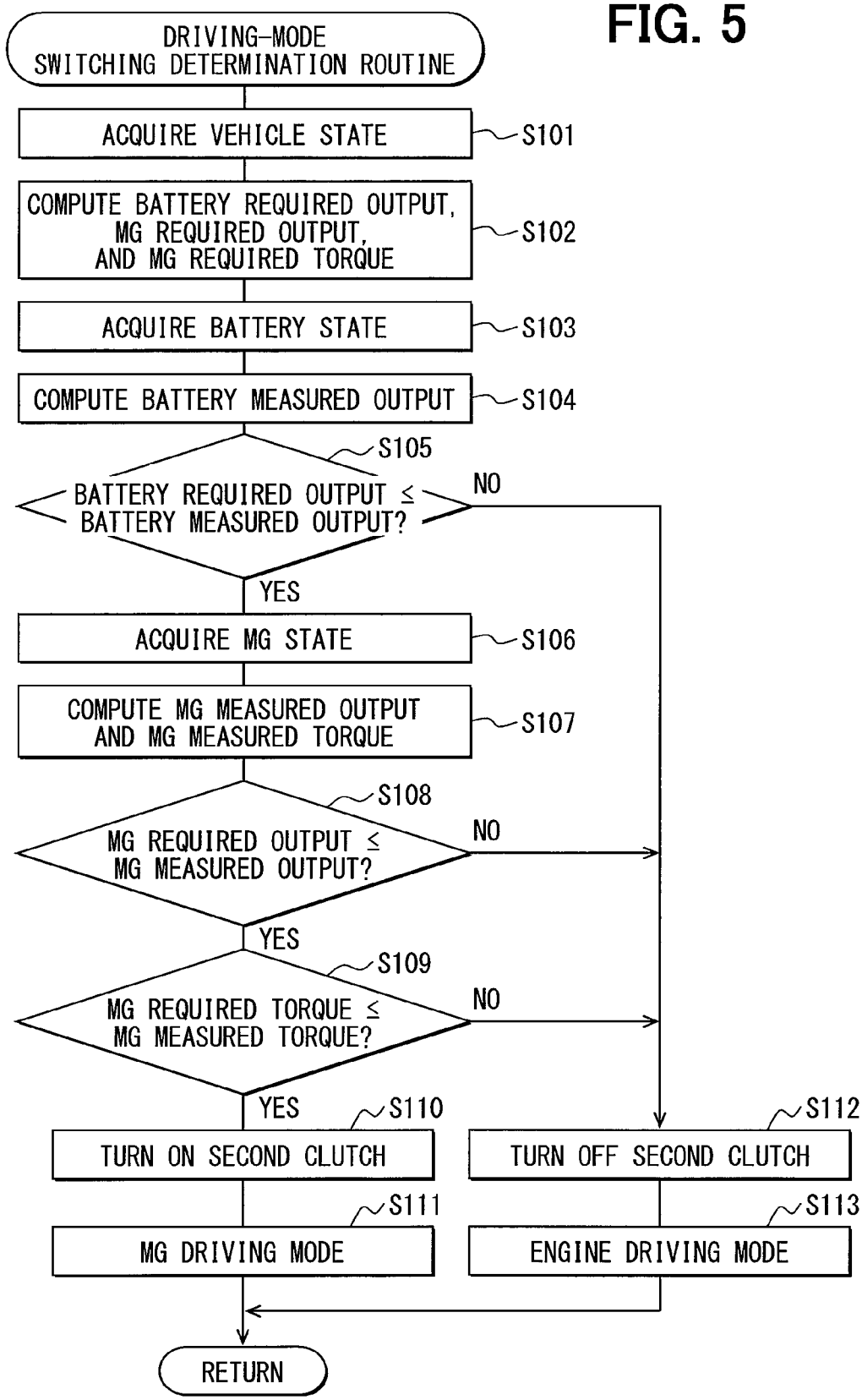
FIG. 5 is a flowchart showing a driving-mode switching determination routine.

As shown in FIG. 5, the ECU 41 executes a driving-mode switching determination routine to compute a torque of the MG 12 which is necessary to achieve the request driving power. The torque of the MG 12 is referred to as a MG required torque. When the ECU 41 determines that the torque of the MG 12 is deficient based on the MG required torque, the ECU 41 switches the vehicle driving mode to the engine driving mode. Therefore, when the power of the MG 12 is deficient for the request driving power, the ECU 41 switches the vehicle driving mode to the engine driving mode, and the ECU 41 can use the power of the engine 11 to match the request driving power.

Further, the ECU 41 determines whether the vehicle is traveling on a sloping road based on an output signal of the tilt sensor 29. When the ECU 41 determines that the torque of the MG 12 on the sloping road is deficient, the ECU 41 switches the vehicle driving mode to the engine driving mode. Therefore, when the power of the MG 12 is deficient for the vehicle to climb on the sloping road, the ECU 41 switches the vehicle driving mode to the engine driving mode, and the ECU 41 can use the power of the engine 11 to climb on the sloping road. Thus, it is not necessary to make the MG 12 have a high torque, and a cost of the MG 12 and a cost of the inverter 31 can be reduced.

Figure 6:
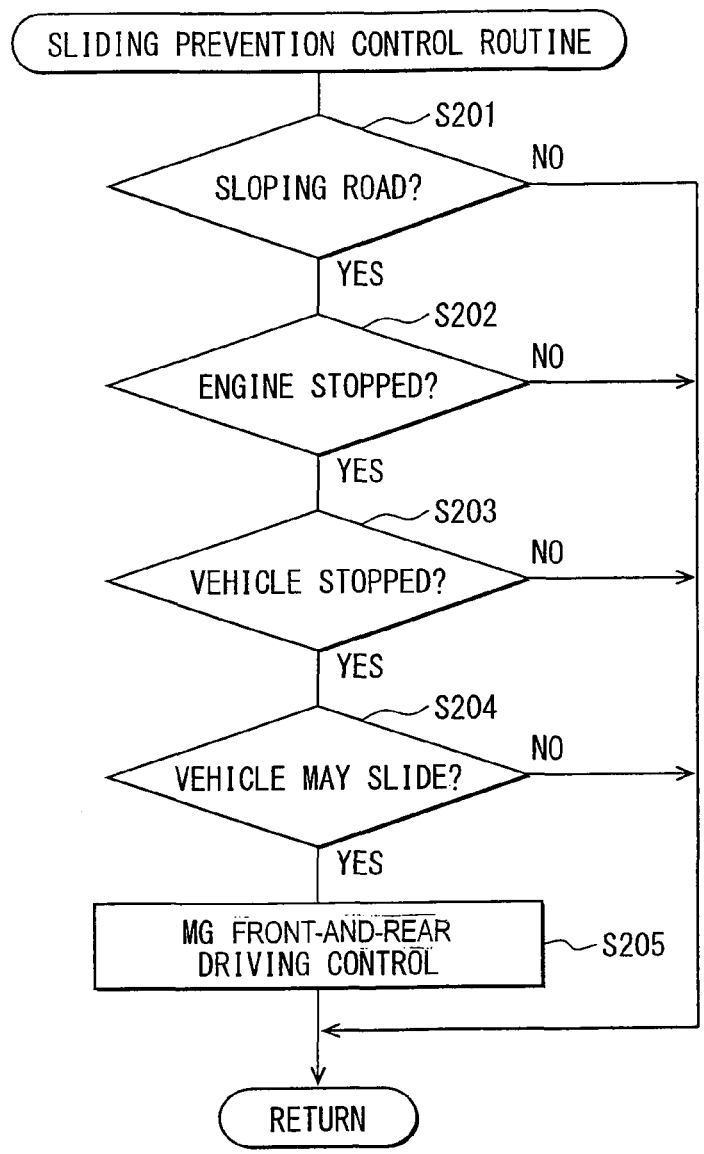
FIG. 6 is a flowchart showing a sliding prevention control routine.

As shown in FIG. 6, the ECU 41 executes a sliding prevention control routine to determine whether the vehicle is traveling on the sloping road based on the output signal of the tilt sensor 29. When the ECU 41 determines that the vehicle may slide on the sloping road in a case where the vehicle is stopped on the sloping road and the engine 11 is stopped, the ECU 41 keeps the vehicle to stop by alternately switching a driving direction of the MG 12 to a front direction or a rear direction at a predetermined frequency. Therefore, when the vehicle is stopped on the sloping road and the engine 11 is stopped, since a sliding of the vehicle on the sloping road can be prevented by the MG 12, an improvement of a brake to prevent the sliding is not necessary. Further, since the driving direction of the MG 12 is alternately switched at the predetermined frequency, a super heat of the MG 12 can be prevented.

Figure 7:
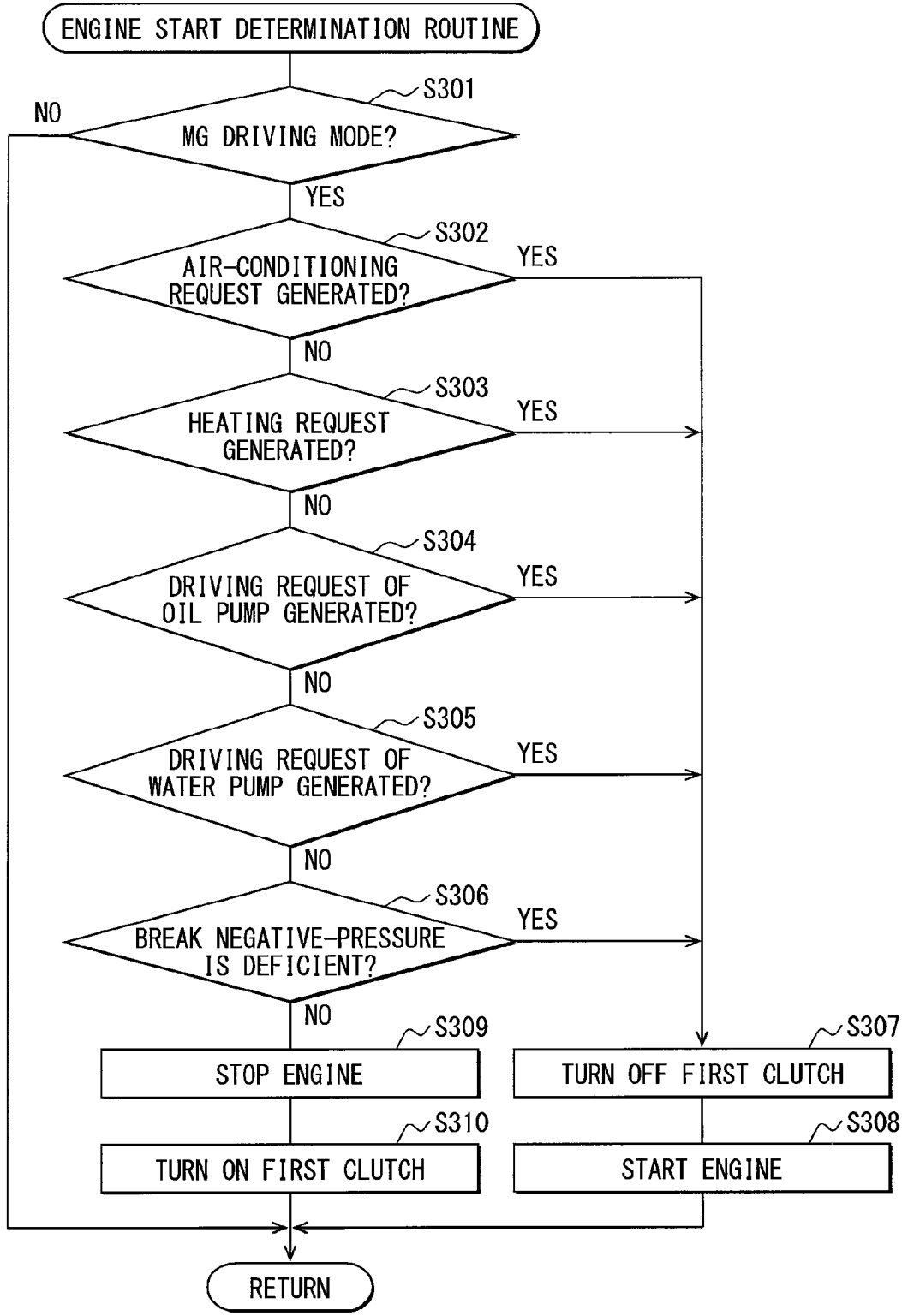
FIG. 7 is a flowchart showing an engine start determination routine.

As shown in FIG. 7, the ECU 41 executes an engine start determination routine to turn off the first clutch 18 to disconnect the transmission 15 with the first differential gear mechanism 16 and starts the engine 11, in a case where a driving request of at least one of the water pump 22, the oil pump 23, and the air-conditioner compressor 24 is generated in the MG driving mode. When the first clutch 18 is turned off, the first clutch 18 is opened. Thus, when the driving request of the accessory is generated in the MG driving mode, it is not necessary to provide an extra device such as an electrical water pump, an electrical oil pump, or an electrical air-conditioner compressor, because the power of the engine 11 can drive the accessory while the MG driving mode is held.

Further, when a heating request is generated in the MG driving mode, the ECU 41 turns off the first clutch 18 and starts the engine 11. Thus, when the heating request is generated in the MG driving mode, it is not necessary to provide an extra heat source because a heat of the engine 11 can be used while the MG driving mode is held. For example, the heat of the engine 11 may be a heat of coolant.

When a brake negative-pressure becomes deficient in the MG driving mode, the ECU 41 turns off the first clutch 18 and starts the engine 11. The brake negative-pressure is a negative pressure of the brake booster. Thus, when the brake negative-pressure becomes deficient in the MG driving mode, it is not necessary to provide an extra device such as an electrical negative-pressure pump because the intake pipe negative-pressure of the engine 11 is supplied to the brake booster to cancel a deficiency of the brake negative-pressure while the MG driving mode is held.

Hereafter, routines executed by the ECU 41 will be described with reference to FIGS. 5 to 7.

As shown in FIG. 5, when the ECU 41 is activated, the driving-mode switching determination routine is executed at a predetermined time period. At 101, the ECU 41 acquires a vehicle state such as the request driving power computed based on the tilt angle detected by the tilt sensor 29 or the accelerator opening degree. Further, the ECU 41 may determines whether the vehicle is traveling on the sloping road by determining whether the tilt angle is greater than or equal to a predetermined value.

At 102, the ECU 41 computes a battery required output, a MG required output, and the MG required torque by a map or a mathematical formula. The battery required output is an output of the battery 32 which is necessary to make the MG 12 achieve the request driving power. The MG required output is an output of the MG 12 which is necessary to achieve the request driving power. The MG required torque is the torque of the MG 12 which is necessary to achieve the request driving power.

At 103, the ECU 41 acquires a battery state such as a temperature of the battery 32, the SOC of the battery 32, or a deterioration state of the battery 32. At 104, the ECU 41 computes a battery measured output based on the battery state by using a map or a mathematical formula. The battery measured output is a measured value of the output of the battery 32.

At 105, the ECU 41 determines whether the battery required output is less than or equal to the battery measured output. When the ECU 41 determines that the battery required output is greater than the battery measured output, the output of the battery 32 is deficient. Then, the ECU 41 proceeds to 112, and turns off the second clutch 21. At 113, the ECU 41 switches or keeps the vehicle driving mode to the engine driving mode.

At 105, when the ECU 41 determines that the battery required output is less than or equal to the battery measured output, the ECU 41 proceeds to 106. At 106, the ECU 41 acquires a MG state such as a temperature of the MG 12, a voltage of the MG 12, or a current of the MG 12. At 107, the ECU 41 computes a MG measured output and a MG measured torque based on the MG state by using a map or a mathematical formula. The MG measured output is a measured value of the output of the MG 12, and the MG measured torque is a measured value of the torque of the MG 12.

At 108, the ECU 41 determines whether the MG required output is less than or equal to the MG measured output. When the ECU 41 determines that the MG required output is greater than the MG measured output, the output of the MG 12 is deficient. Then, the ECU 41 proceeds to 112, and turns off the second clutch 21. At 113, the ECU 41 switches or keeps the vehicle driving mode to the engine driving mode.

At 108, when the ECU 41 determines that the MG required output is less than or equal to the MG measured output, the ECU 41 proceeds to 109. At 109, the ECU 41 determines whether the MG required torque is less than or equal to the MG measured torque. When the ECU 41 determines that the MG required torque is greater than the MG measured torque, the torque of the MG 12 is deficient. Then, the ECU 41 proceeds to 112, and turns off the second clutch 21. At 113, the ECU 41 switches or keeps the vehicle driving mode to the engine driving mode.

At 109, when the ECU 41 determines that the MG required torque is less than or equal to the MG measured torque, the request driving power can be achieved by the power of the MG 12. Then, the ECU 41 proceeds to 110, and turns on the second clutch 21 to connect the MG 12 with the second differential gear mechanism 19. At 111, the ECU 41 switches or keeps the vehicle driving mode to the MG driving mode.

As shown in FIG. 6, when the ECU 41 is activated, the sliding prevention control routine is executed at a predetermined time period. At 201, the ECU 41 determines whether the vehicle is traveling on the sloping road by determining whether the tilt angle is greater than or equal to a predetermined value. When the ECU 41 determines that the vehicle is traveling on the sloping road, the ECU 41 proceeds to 202. At 202, the ECU 41 determines whether the engine 11 is stopped (no idling).

When the ECU 41 determines that the engine 11 is stopped, the ECU 41 proceeds to 203. At 203, the ECU 41 determines whether the vehicle is stopped. For example, the ECU 41 may determine whether the vehicle speed is zero. When the ECU 41 determines that the vehicle is stopped, the ECU 41 proceeds to 204. At 204, the ECU 41 determines whether the vehicle may slide. For example, the ECU 41 may determine whether a side brake is off and the brake is off. Alternatively, the ECU 41 may determine whether the side brake is off and the brake operating amount is less than or equal to a predetermined amount.

When the ECU 41 determines that the vehicle may slide, the ECU 41 proceeds to 205. At 205, the ECU 41 executes a MG front-and-rear driving control to keep the vehicle to stop. In the MG front-and-rear driving control, the ECU 41 alternately switches the driving direction of the MG 12 to the front direction or the rear direction at the predetermined frequency.

However, when at least one of 201 to 204 is determined to be No, the ECU 41 terminates the present routine without executing the MG front-and-rear driving control.

As shown in FIG. 7, when the ECU 41 is activated, the engine start determination routine is executed at a predetermined time period. At 301, the ECU 41 determines whether the vehicle driving mode is at the MG driving mode. When the ECU 41 determines that the vehicle driving mode is not at the MG driving mode, the ECU 41 terminates the present routine. In this case, the ECU 41 controls the engine 11 in the engine driving mode.

At 301, when the ECU 41 determines that the vehicle driving mode is at the MG driving mode, the ECU 41 proceeds to 302. At 302, the ECU 41 determines whether an air-conditioning request is generated. The air-conditioning request may be a driving request of the air-conditioner compressor 24, and may be determined by determining whether an air-conditioner switch is turned on. When the ECU 41 determines that the air-conditioning request is generated, it is necessary to start the engine 11. Therefore, the ECU 41 proceeds to 307, and turns off the first clutch 18. Then, the ECU 41 proceeds to 308, starts the engine 11, and drives the accessory by using the power of the engine 11. In this case, the accessory includes the air-conditioner compressor 24.

At 302, when the ECU 41 determines that the air-conditioning request is not generated, the ECU 41 proceeds to 303. At 303, the ECU 41 determines whether the heating request is generated. When the ECU 41 determines that the heating request is generated, it is necessary to start the engine 11. Therefore, the ECU 41 proceeds to 307, and turns off the first clutch 18. Then, the ECU 41 proceeds to 308, starts the engine 11, and increases a coolant temperature by using the heat of the engine 11.

At 303, when the ECU 41 determines that the heating request is not generated, the ECU 41 proceeds to 304. At 304, the ECU 41 determines whether a driving request of the oil pump 23 is generated. As shown in FIG. 8, the driving request of the oil pump 23 is generated in a case where the oil pressure is less than or equal to an engine start threshold pressure. Then, the driving request of the oil pump 23 is canceled in a case where the oil pressure is greater than or equal to an engine stop threshold pressure.

At 304, when the ECU 41 determines that the driving request of the oil pump 23 is generated, it is necessary to start the engine 11. Therefore, the ECU 41 proceeds to 307, and turns off the first clutch 18. Then, the ECU 41 proceeds to 308, starts the engine 11, and drives the accessory by using the power of the engine 11. In this case, the accessory includes the oil pump 23.

At 304, when the ECU 41 determines that the driving request of the oil pump 23 is not generated, the ECU 41 proceeds to 305. At 305, the ECU 41 determines whether a driving request of the water pump 22 is generated. As shown in FIG. 8, the driving request of the water pump 22 is generated in a case where a coolant flow-rate is less than or equal to an engine start threshold flow-rate. Then, the driving request of the water pump 22 is canceled in a case where the coolant flow-rate is greater than or equal to an engine stop threshold flow-rate.

At 305, when the ECU 41 determines that a driving request of the water pump 22 is generated, it is necessary to start the engine 11. Therefore, the ECU 41 proceeds to 307, and turns off the first clutch 18. Then, the ECU 41 proceeds to 308, starts the engine 11, and drives the accessory by using the power of the engine 11. In this case, the accessory includes the water pump 22.

At 305, when the ECU 41 determines that a driving request of the water pump 22 is not generated, the ECU 41 proceeds to 306. At 306, the ECU 41 determines whether the brake negative-pressure is deficient. For example, the ECU 41 determines whether a negative-pressure of the brake booster detected by the pressure sensor 30 is greater than or equal to a predetermined pressure. At 306, when the ECU 41 determines that the brake negative-pressure is deficient, it is necessary to start the engine 11. Therefore, the ECU 41 proceeds to 307, and turns off the first clutch 18. Then, the ECU 41 proceeds to 308, starts the engine 11, and supplies the intake pipe negative-pressure of the engine 11 to the brake booster.

At 306, when the ECU 41 determines that the brake negative-pressure is sufficient, it is not necessary to start the engine 11. Therefore, the ECU 41 proceeds to 309, and stops the engine 11. Then, the ECU 41 proceeds to 310, and turns on the first clutch 18. In addition, when the engine 11 is stopped, the ECU 41 may repeatedly turn on or turn off the first clutch 18.

Referring to FIG. 8, an example of an engine starting in the MG driving mode will be described. During a period that the request driving power is less than or equal to a predetermined power, since the engine driving condition is not satisfied, the vehicle driving mode keeps to the MG driving mode. In other words, the vehicle travels or stops by driving the second axle 14 according to the power of the MG 12 while the engine 11 keeps stopping.

The ECU 41 turns off the first clutch 18, starts the engine 11, and drives the accessory by using the power of the engine 11, at the time point t1 that the oil pressure is less than or equal to the engine start threshold pressure and the driving request of the oil pump 23 is generated in the MG driving mode. In this case, the accessory includes the oil pump 23. Next, the ECU 41 stops the engine 11 and turns on the first clutch 18, at the time point t2 that the oil pressure is greater than or equal to the engine stop threshold pressure and the driving request of the oil pump 23 is canceled in the MG driving mode.

Next, the ECU 41 turns off the first clutch 18, starts the engine 11, and drives the accessory by using the power of the engine 11, at a time point t3 that the coolant flow-rate is less than or equal to the engine start threshold flow-rate and the driving request of the water pump 22 is generated in the MG driving mode. Next, the ECU 41 stops the engine 11 and turns on the first clutch 18, at a time point t4 that the coolant flow-rate is greater than or equal to the engine stop threshold flow-rate and the driving request of the water pump 22 is canceled in the MG driving mode.

Next, the ECU 41 turns off the first clutch 18, starts the engine 11, and drives the accessory by using the power of the engine 11, at a time point t5 that the air-conditioning request is generated in the MG driving mode. Next, the ECU 41 stops the engine 11 and turns on the first clutch 18, at a time point t6 that the air-conditioning request is canceled in the MG driving mode.

According to the present embodiment, since the accessory can be driven by the power of the engine 11, a private power source for the accessory such as a motor is not necessary. Thus, a configuration of the vehicle can be simplified, and a cost of the vehicle can be reduced.

Further, since the power of the engine 11 is transmitted to the first axle 13 and the power of the MG 12 is transmitted to the second axle 14, a space for providing the MG 12 can be readily ensured. Since the MG 12 can be provided at the second axle 14 which is different from the first axle 13 driven by the engine 11, a changing of the vehicle can be restricted in a case where the hybrid vehicle is developed by using an engine vehicle as a base part.

Furthermore, since the vehicle driving mode is switched between the engine driving mode and the MG driving mode, only a control system relative to the MG driving mode is necessary to be developed when the hybrid vehicle is developed by using the engine vehicle as the base part. In this case, a development man-hour can be reduced comparing to a development in which both a control system relative to the MG driving mode and a control system relative to a hybrid mode are developed.

Moreover, according to the present embodiment, the cooling device 38 circulating the coolant between the engine 11, the inverter 31, and the radiator 33, is provided to cool down the engine 11 and the inverter 31. Since this configuration reduces a number of parts in the cooling system comparing to a configuration in which a cooling device is provided for the engine and another cooling device is provided for the inverter, a size can be miniaturized and a cost can be reduced.

Second Embodiment

Next, a second embodiment according to the present disclosure will be described with reference to FIG. 9. The substantially same parts and the components as the first embodiment are indicated with the same reference numeral and the same description will not be reiterated. Hereafter, features of the second embodiment different from the first embodiment will be detailed.

The power of the engine 11 and the power of the MG 12 are transmitted to the first axle 13 and the second axle 14, respectively. In this case, the MG 12 includes a left MG 12L and a right MG 12R, the second wheel 20 includes a left wheel 20L and a right wheel 20R, and the second axle 14 includes a left axle 14L and a right axle 14R. As shown in FIG. 9, the left MG 12L is provided to transmit a power of the left MG 12L to the left axle 14L for the left wheel 20L, and the right MG 12R is provided to transmit a power of the right MG 12R to the right axle 14R for the right wheel 20R. The power of the left MG 12L is transmitted to the left wheel 20L via a left gear mechanism 42L and the left axle 14L, and the power of the right 12R is transmitted to the right wheel 20R via a right gear mechanism 42R and the right axle 14R. A left clutch 21 L is provided between the left MG 12L and the left gear mechanism 42L, and a right clutch 21 R is provided between the right MG 12R and the right gear mechanism 42R. When the hybrid vehicle turns around, the ECU 41 allows a rotation difference between the left axle 14L and the right axle 14R by separately controlling a rotational speed of the left MG 12L and a rotational speed of the right MG 12R.

According to the second embodiment, since the ECU 41 allows a rotation difference between the left axle 14L and the right axle 14R by separately controlling the rotational speed of the left MG 12L and the rotational speed of the right MG 12R, a differential gear mechanism for allowing the rotation difference between the left axle 14L and the right axle 14R can be canceled, and a cost can be reduced.

Third Embodiment

Next, a third embodiment according to the present disclosure will be described with reference to FIG. 10. The substantially same parts and the components as the first embodiment are indicated with the same reference numeral and the same description will not be reiterated. Hereafter, features of the third embodiment different from the first embodiment will be detailed.

As shown in FIG. 10, the power of the engine 11 and the power of the MG 12 are transmitted to the same axle corresponding to an axle 13. The power of the engine 11 is transmitted to a wheel 17 via the transmission 15, a differential gear mechanism 16, and the axle 13. The power of the MG 12 is transmitted to the wheel 17 via the differential gear mechanism 16 and the axle 13. A clutch 21 is provided between the MG 12 and the differential gear mechanism 16.

According to the third embodiment, since the power of the engine 11 and the power of the MG 12 are transmitted to the axle 13, a driving axle is not changed even switching the vehicle driving mode between the engine driving mode and the MG driving mode. In other words, the powers are not transmitted between a front wheel drive and a rear wheel drive. Thus, a development man-hour relative to the vehicle travel can be restricted. For example, the development man-hour may be a man-hour for developing a suspension system.

According to the above embodiments, the water pump 22, the oil pump 23, and the air-conditioner compressor 24 rotate synchronously with the engine 11. In other words, the water pump 22, the oil pump 23, and the air-conditioner compressor 24 are driven by the power of the engine 11. However, it is not limited to the above configuration. For example, at least one of the water pump 22, the oil pump 23, and the air-conditioner compressor 24 may rotate synchronously with the engine 11.

According to the above embodiments, the cooling device 38 for cooling down the engine 11 and the inverter 31 is provided. In other words, the cooling device 38 is shared by the engine 11 and the inverter 31. However, it is not limited to the above configuration. A cooling device may be provided for the engine and another cooling device may be provided for the inverter.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A driving-power control device for a vehicle equipped with an engine and a motor as power sources, the driving-power control device comprising:
   an axle to which a power of the engine and a power of the motor are transmitted in parallel;
   at least one of a water pump, an oil pump, and an air-conditioner compressor, which rotates synchronously with the engine;
   a control portion switching a vehicle driving mode between an engine driving mode that the axle is driven by the power of the engine and a motor driving mode that the axle is driven by the power of the motor; and
   a motor-side clutch which blocks or allows a power transmission between the motor and the axle, wherein
   the control portion opens the motor-side clutch in the engine driving mode.

2. The driving-power control device for a vehicle, according to claim 1, wherein
   the control portion switches the vehicle driving mode between the engine driving mode and the motor driving mode, in accordance with at least one of a charging state of a battery, a driver request, a request driving power, and a vehicle speed.

3. A driving-power control device for a vehicle equipped with an engine and a motor as power sources, the driving-power control device comprising:
   an axle to which a power of the engine and a power of the motor are transmitted in parallel;
   at least one of a water pump, an oil pump, and an air-conditioner compressor, which rotates synchronously with the engine;
   a control portion switching a vehicle driving mode between an engine driving mode that the axle is driven by the power of the engine and a motor driving mode that the axle is driven by the power of the motor; and
   an engine-side clutch which blocks or allows a power transmission between the engine and the axle, wherein
   the control portion opens the engine-side clutch to start the engine, when a driving request of at least one of the water pump, the oil pump, and the air-conditioner compressor is generated in the motor driving mode.

4. A driving-power control device for a vehicle equipped with an engine and a motor as power sources, the driving-power control device comprising:
   an axle to which a power of the engine and a power of the motor are transmitted in parallel;
   at least one of a water pump, an oil pump, and an air-conditioner compressor, which rotates synchronously with the engine;
   a control portion switching a vehicle driving mode between an engine driving mode that the axle is driven by the power of the engine and a motor driving mode that the axle is driven by the power of the motor; and
   an engine-side clutch which blocks or allows a power transmission between the engine and the axle, wherein
   the control portion opens the engine-side clutch to start the engine, when a heating request is generated in the motor driving mode.

5. A driving-power control device for a vehicle equipped with an engine and a motor as power sources, the driving-power control device comprising:
   an axle to which a power of the engine and a power of the motor are transmitted in parallel;
   at least one of a water pump, an oil pump, and an air-conditioner compressor, which rotates synchronously with the engine;
   a control portion switching a vehicle driving mode between an engine driving mode that the axle is driven by the power of the engine and a motor driving mode that the axle is driven by the power of the motor; and
   an engine-side clutch which blocks or allows a power transmission between the engine and the axle, wherein
   the control portion opens the engine-side clutch to start the engine, when a brake negative-pressure becomes deficient in the motor driving mode.

6. A driving-power control device for a vehicle equipped with an engine and a motor as power sources, the driving-power control device comprising:

an axle to which a power of the engine and a power of the motor are transmitted in parallel;

at least one of a water pump, an oil pump, and an air-conditioner compressor, which rotates synchronously with the engine;

a control portion switching a vehicle driving mode between an engine driving mode that the axle is driven by the power of the engine and a motor driving mode that the axle is driven by the power of the motor; and a tilt sensor detecting a tilt angle of the vehicle, wherein the control portion determines whether the vehicle is traveling on a sloping road based on an output signal of the tile sensor, and the control portion switches the vehicle driving mode to the engine driving mode, when the control portion determines that a torque of the motor on the sloping road is deficient.

7. A driving-power control device for a vehicle equipped with an engine and a motor as power sources, the driving-power control device comprising:

an axle to which a power of the engine and a power of the motor are transmitted in parallel;

at least one of a water pump, an oil pump, and an air-conditioner compressor, which rotates synchronously with the engine;

a control portion switching a vehicle driving mode between an engine driving mode that the axle is driven by the power of the engine and a motor driving mode that the axle is driven by the power of the motor; and a tilt sensor detecting a tilt angle of the vehicle, wherein the control portion determines whether the vehicle is traveling on the sloping road, and the control portion keeps the vehicle to stop by alternately switching a driving direction of the motor to a front direction or a rear direction at a predetermined frequency, when the control portion determines that the vehicle may slide on the sloping road in a case where the vehicle is stopped on the sloping road and the engine is stopped.

8. The driving-power control device for a vehicle, according to claim 2, wherein the control portion computes a motor required torque corresponding to a torque of the motor necessary to achieve the request driving power, and the control portion switches the vehicle driving mode to the engine driving mode, when the control portion determines that the torque of the motor is deficient based on the motor required torque.

9. A driving-power control device for a vehicle equipped with an engine and a motor as power sources, the driving-power control device comprising:

an axle to which a power of the engine and a power of the motor are transmitted in parallel;

at least one of a water pump, an oil pump, and an air-conditioner compressor, which rotates synchronously with the engine;

a control portion switching a vehicle driving mode between an engine driving mode that the axle is driven by the power of the engine and a motor driving mode that the axle is driven by the power of the motor; and a cooling device circulating a coolant between an inverter that drives the motor, the engine, and a radiator, to cool down the engine and the inverter.

10. A driving-power control device for a vehicle equipped with an engine and a motor as power sources, the driving-power control device comprising:

an axle to which a power of the engine and a power of the motor are transmitted in parallel;

at least one of a water pump, an oil pump, and an air-conditioner compressor, which rotates synchronously with the engine;

a control portion switching a vehicle driving mode between an engine driving mode that the axle is driven by the power of the engine and a motor driving mode that the axle is driven by the power of the motor; wherein the power of the engine and the power of the motor are transmitted to different axles, and the motor includes a left motor that transmits a power of the left motor to a left axle, and a right motor that transmits a power of the right motor to a right axle, and the control portion allows a rotation difference between the left axle and the right axle by separately controlling a rotational speed of the left motor and a rotational speed of the right motor.

11. The driving-power control device for a vehicle, according to claim 1, wherein the power of the engine and the power of the motor are transmitted to the same axle.

* * * * *